United States Patent Office 2,722,518
Patented Nov. 1, 1955

2,722,518

SYNTHETIC LUBRICANTS

Forrest J. Watson, Berkeley, Calif., assignor to Shell Development Company, Emeryville, Calif., a corporation of Delaware No Drawing. Application June 27, 1952,
Serial No. 296,099

5 Claims. (Cl. 252—46.7)

This invention relates to compounded lubricating oils and, more particularly, to ester type lubricants having dispersed therein a synergistic combination of oxidation and corrosion inhibitors.

Organic compounds, such as lubricating oils, undergo oxidation upon exposure to air. This process is accentuated by elevated temperatures such as occur in engines and other operating machinery. When such organic compositions are used as motor or machinery lubricants, their stability is still further drastically reduced due to their contact with metal surfaces which give up metallic particles into the lubricant. Such abraded or dissolved metals or metal salts appear to act as oxidation catalysts in the lubricant causing the formation of primary oxidation products which in turn cause further degradation of the organic compounds present in the composition. In addition, water also causes corrosion of metallic surfaces and accentuates oxidation of the lubricant. Problems of this nature are encountered in mineral oils but appear to be particularly troublesome in synthetic oleaginous fluids exemplified by esters, as more particularly defined hereinafter, such as phosphates, carboxylates and silicates.

Numerous oxidation and corrosion inhibitors have been found for use in lubricating compositions and many combinations thereof also have been tested. In many instances the effect of such combination is merely the additive effect of each of the inhibitors employed. In other cases synergism is exhibited between the additives used, thus promoting to an unaccountable degree the oxidation and corrosion protection of the composition. It is impossible to predict, however, just which class of inhibitors will be effective synergists until such combinations have actually been tested and found to be advantageous. Moreover the results obtained in a particular chemical class of lubricating base is not indicative of the results to be expected in other organic media. For example, a class of oxidation or corrosion inhibitor which is effective in mineral oil may be substantially ineffective, or even act as a pro-oxidant, when utilized in an ester type oleaginous fluid. Likewise, synergizing pairs or sets of additives which are effective for this purpose in mineral oil may have little or no advantage when employed in ester lubricants.

It is an object of the present invention to provide improved oleaginous compositions. It is a further object of this invention to provide improved hydraulic fluids and lubricating compositions which are resistant to degradation or oxidation and exhibit improved corrosion characteristics. It is a particular object of this invention to provide improved ester type oleaginous fluid compositions.

Now, in accordance with this invention, it has been found that the corrosion and oxidation characteristics of ester type lubricants are unexpectedly improved by a synergistic combination of effective amounts each of thiodiaryl amines and diaminodiaryl alkanes. This invention is especially applicable to esters such as the organic esters of phosphorus acids, the organic esters of silicic acid and the organic esters of dicarboxylic acids, all as more fully defined hereinafter.

The diamino diaryl alkanes useful in the present compositions are preferably diamino diphenyl alkanes wherein the alkane radicals have from 1–4 carbon atoms but the phenyl radicals are separated by no more than 2 carbon atoms. Either the phenyl or amino groups may be still further modified by such substituents as alkyl, aryl, alkaryl or aralkyl groups which may replace one or more hydrogen atoms. The most effective group of such materials comprise diamino diphenyl methanes wherein the two hydrogen atoms of each amino radical are substituted by alkyl radicals having from 1–4 carbon atoms each. The following list presents typical species of materials falling within the described class and alternative varieties will be clear to experts in the art:

N,N'-tetraalkyl diamino diphenylalkanes:
    N,N'-tetramethyl diamino diphenylmethane
    N,N'-tetraethyl diamino diphenylmethane
    N,N'-tetrapropyl diamino diphenylmethane
    N,N'-tetramethyl diamino diphenylethane
    N,N'-tetraethyl diamino diphenylethane
    2,2'-diethyl-4,4'-diamino diphenylmethane
    2,2'-dibutyl-4,4'-diamino diphenylethane These materials may be employed in amounts, together with the thiodiaryl amines described hereinafter, which are sufficient to substantially improve the oxidation and corrosion tendencies of the ester type oleaginous fluids in which they are dispersed. Ordinarily this will be in amounts varying from 0.25% and 5% based on the weight of the total composition. The class of additives just described has been employed in lubricating compositions and in conjunction with certain other classes of lubricant additives. However, the present invention is based upon an entirely new synergistic combination neither shown nor suggested in the prior art.

The second class of additives to be incorporated, together with the above diamino diaryl alkanes, comprise thiodiaryl amines. Compounds of this variety have the general formula which follows:

wherein R is an aromatic radical. Three principal classes of inhibitors fall within the above general formula. These comprise species based upon thiodiphenylamine, those based on thiophenyl naphthylamine and finally those based upon thiodinaphthylamine. The preferred class of inhibitors of this type comprise the thiodiphenylamines as typified by phenothiazine. The aryl radicals contained in these materials may be modified by such substituents as alkyl radicals having less than 6 carbon atoms each, hydroxy groups or amino radicals and any amino radicals in the compound may be likewise modified by replacement of hydrogen atoms with alkyl, aryl, hydroxy or amino substituents. The general formulae and species thereunder of these three classes of materials are given herewith:

(Based on thiodiphenylamine)

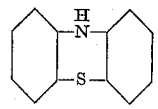

Thio-2,2'-dimethyldiphenylamine
Thio-4,4'-didecyldiphenylamine
Thio-4,4'-dihydroxydiphenylamine
Thio-3,3'-dibutyl diphenylamine (Based on thiophenyl naphthylamine)

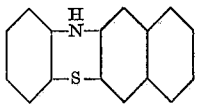

Thio-4-methylphenyl naphthylamine
Thiophenyl-6-ethyl naphthylamine
Thio-4-hydroxyphenyl naphthylamine (Based on thiodinaphthylamine)

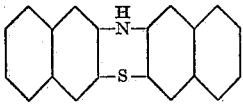

Thio-di-alpha-naphthylamine
Thio-di-beta-naphthylamine

A particularly effective type of additive comprises the amino thiodiphenylamines which have the general formula:

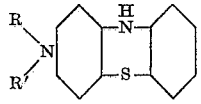

R and R' in the above formula may be substituents such as hydrogen, alkyl, aryl, heterocyclic or cycloparaffin groups. Species falling within this class are given below:

- 4-aminothiodiphenylamine
- 2-aminothiodiphenylamine
- 3-aminothiodiphenylamine
- N-acetyl-2-aminothiodiphenylamine
- N-benzyl-2-aminothiodiphenylamine
- N-acetyl-4-aminothiodiphenylamine
- Dimethyl-4-aminothiodiphenylamine As in the case of the first additive, the thiodiarylamines should be used in amounts, together with the diamino diarylalkanes, sufficient to materially improve the corrosion and oxidation characteristics of the ester type oleaginous fluid, said amounts usually being between about 0.25% and about 5% by weight of the total composition.

It has been determined that the two main classes of additives defined hereinbefore perform in a synergistic manner when incorporated in ester type lubricants which are then subjected to elevated temperatures in the presence of oxygen. The synergistic effect is especially noticeable when metals are present such as copper, iron, zinc, aluminum and cadmium. While esters in general appear to respond to the synergistic combination defined, it has been found that the latter is especially effective when utilized in ester of phosphorus acid, silicic or dicarboxylic acid.

THE PHOSPHORUS ESTERS

The phosphorus esters useful for inclusion in the present compositions comprise the normally liquid aliphatic esters of acids of phosphorus. While the trialkyl phosphates are particularly preferred, other classes are suitable in addition to or in place of said phosphates. These include dialkyl hydrocarbon phosphonates, especially dialkyl alkanephosphonates, alkyl dialkanephosphinates, diphosphorus compounds such as bis(dialkyl phosphono)alkanes, bis(alkyl alkane phosphino)alkanes, alkane diol bis(dialkane phosphinate), alkane diol bis(dialkyl phosphates), alkane diol bis(alkyl alkane phosphonates) and the corresponding ethers of the above diphosphorus compounds. Classes of the latter which are included are bis(dialkyl phosphono alkyl)ethers, bis(alkyl alkanephosphinico alkyl)ethers and bis(dialkyl phosphato alkyl)ether.

The phosphorus esters which are particularly useful in these compositions ordinarily have a total of at least 18 carbon atoms per molecule; preferably this total is between about 20 and about 32 carbon atoms per molecule. Typical trialkyl phosphates which are especially suitable contain alkyl radicals having from about 6 to about 12 carbon atoms each and include the following:

Trihexyl phosphates
Triheptyl phosphates
Trioctyl phosphates, e. g., tri(2-ethylhexyl)phosphate OR, tri(isooctyl)phosphate
Trinonyl phosphates, e. g., tri(3,5,5-trimethylhexyl)phosphate
Tridecyl phosphates
Tridodecyl phosphates
Dihexyl octyl phosphate Typical species of phosphonates and phosphinates are given below:

Dialkyl hydrocarbon phosphonates:
  Di(2-ethylhexyl)hexanephosphonate
  Dihexyl hexanephosphonate
  Dioctyl (3,5,5 trimethylhexane)phosphonate
  Dihexyl benzenephosphonate
Alkyl dialkane phosphinates:
  Butyl di(2-ethylhexane)phosphinate
  Hexyl diheptane phosphinates Referring now to the diphosphorus compounds, these may be represented with the following general formula:

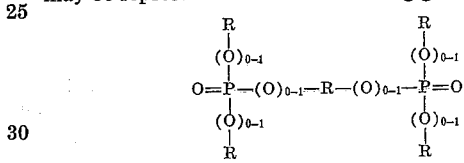

wherein each R is an aliphatic hydrocarbon radical.

The above classification of diphosphorus compounds includes especially substituted aliphatic hydrocarbons bearing 2 phosphorus radicals in the form of phosphate, phosphonate, phosphinate, or phosphine oxide groups. One of the more preferred classes of liquids suitable for use, according to the present invention, includes the bis(dialkyl phosphono)alkanes. These have the general configuration of

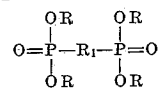

Preferably $R_1$ in the above formula is an alpha,omega-alkylene hydrocarbon radical of at least 3 carbon atoms. Each of the other R substituents may be a hydrocarbon radical of such nature that the entire compound is substantially fluid at operating temperatures. Preferably each of these groups contains from 3 to 9 carbon atoms each, and still more preferably at least two of them are of branched configuration. The following suitable species are typical of this presented configuration:

Bis-1,3-(diisobutyl phosphono)propane
Bis-1,4-(diisopropyl phosphono)butane
Bis-1,5-[di(3-methylbutyl)phosphono]pentane
Bis-1,6-[di(2-ethylhexyl)phosphono]hexane
Bis-1,3-[di(3,5,5-trimethylhexyl)phosphono]propane The alkylene group separating the two phosphorus radicals may be shorter than about 12 carbon atoms or may be of branched configuration as typified by the following species:

Bis-1,2-(di-tert-butyl phosphono)ethane
Bis-1,2-(di-tert-butyl phosphono)-3,4-dimethylpentane
Bis-2,4-(di-sec-butyl phosphono)-3,5-dimethylhexane
Bis-1,6-(di-n-pentyl phosphono)-3,4,5-trimethylhexane Another suitable subgeneric group of phosphorus compounds useful in the practice of this invention comprises the alkanediol bis(dialkane phosphinates). These materials have the general configuration:

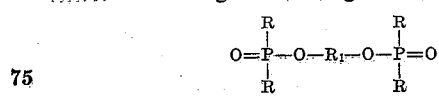

The preferred configurations and carbon contents of the individual portions of this and the following classes are in general those given in the foregoing description of the bis(dialkyl phosphono)alkanes except where especially noted. Preferably the substituent $R_1$ contains from 3 to 9 carbon atoms while the remaining R's have from 4 to 9 carbon atoms each. The following species are typical of this class:

1,5-pentanediol bis-[di(2-ethylhexane)phosphinate]
1,6-hexanediol bis-[di(2-isobutane)phosphinate]
1,7-heptanediol bis-(di-n-butanephosphinate)
3,4-heptanediol bis-[di(3,5,5-trimethylhexane)phosphinate]
2,5-hexanediol bis-(dipentanephosphinate)

Another class of compounds coming within the general scope of this invention are the tetraalkylalkylenediphosphine oxides. These materials have the following general formula:

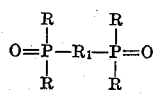

The following species are typical of this class of compounds:

Tetra-n-butylhexamethylenediphosphine oxide
Tetra-tert-butylpentamethylenediphosphine oxide
Tetra-sec-butyl(3,5,5-trimethylhexylene)diphosphine oxide
Tetra-tert-amylheptamethylenediphosphine oxide
Tetra-isopropylpentamethylenediphosphine oxide Another class of useful diphosphorus derivatives includes the alkanediol bis-(dialkyl phosphates) having the following general configuration:

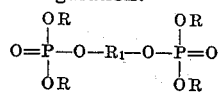

The following list of suitable species illustrates this group:

1,6-hexanediol bis(dibutyl phosphate)
3,methyl-1,6-hexanediol bis(di-tert-butyl phosphate)
2,3-diethyl-1,6-hexanediol bis(di-sec-amyl phosphate)
2,4,4-trimethyl-1,5-pentanediol bis(di-3,5,5-trimethylhexylphosphate)
1,4-butanediol bis(diisopropyl phosphate)

Another sub-generic class constitutes alkanediol bis(alkyl alkanephosphonates) which have the general configuration:

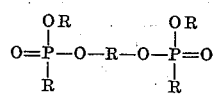

The suitable species which follow illustrate the nature of this class:

1,5-pentanediol bis-(butyl butanephosphonate)
1,4-butanediol bis-(tert-butyl 2-methyl-1-propanephosphonate)
1,6-hexanediol bis-(3,5,5-trimethylhexyl butanephosphonate)
3,4-dimethyl-1,6-hexanediol bis-(tert-amyl pentanephosphonate)
1,2-ethanediol bis-(3,5,5-trimethylhexyl butanephosphonate)

Another class of compounds to be considered includes bis-(alkyl alkanephosphinico)alkanes which have the general configuration:

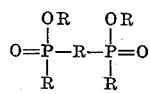

This class is examplified by the following species:
Bis-1,2-(n-butyl butanephosphinico)ethane
Bis-1,3-(tert-butyl butanephosphinico)propane
Bis-1,4-(sec-amyl pentanephosphinico)butane
Bis-1,5-(3,5,5-trimethylhexyl 2,4,4-trimethylpentenephosphinico)pentane
Bis-1,6-(n-hexyl 1-methyl-1-propanephosphinico)hexane It will be understood that symmetrical compounds are not necessary for the operation of the present invention. For example, the various substituents denoted as R in the above general formulae may vary within a given compound, both with respect to carbon atom content and to spatial configuration. The branched configurations are favored due to their generally superior effect upon the lubricating characteristics, especially at low temperatures. Unsaturated hydrocarbon radicals are especially to be desired when they are directly attached to a phosphorus atom since their presence has been found to improve the corrosion characteristics of lubricants prepared therefrom. Additionally, while the two end groups may be identical in a single compound for specific purposes, it is sometimes desirable to include two different types of phosphorus end groups in order to obtain the beneficial properties attributable to each type. Suitable illustrating compounds having mixed end groups are as follows:

1-(butyl butanephosphonico)-2-(di-sec-butyl phosphono)ethane
1-(di-2-ethylhexanephosphinate)-5-(di-butyl phosphate) pentanediol Typical species of the corresponding ethers of diphosphorus compounds are the following:

Bis-[(di-amylphosphono)methyl]ether
Bis-[(di-laurylphosphono)ethyl]ether
Bis-[(butyl hexanephosphinico)ethyl]ether
Bis-[(di-isopropyl phosphono)amyl]ether Details of the preparation and properties of these and other ethers will be found in copending application Serial No. 214,432, filed March 7, 1951, by Denham Harman et al.

Silicate esters also respond to a high degree to the incorporation of the present combination of additive materials. The silicate esters include alkyl, aryl, aralkyl and alkylaryl esters of silicic acid. Typical species within this classification include the following:

Tetra(2-ethylhexyl)silicate
Tetra(n-hexyl)silicate
Bis(2-ethylhexyl)bis(3-methylhexyl)silicate
Tetraphenyl silicate
Tetra(2-ethylphenyl)silicate
Tetracresyl silicate
Tetra(tridecyl)silicate
Tetra(decyl)silicate In addition to the types of esters defined hereinbefore a particularly desirable type may be prepared by esterification of silicic acid, phosphorus acids or dicarboxylic acids with sulfur-containing alcohols which may be either thia-alcohols or thio-alcohols. Thia-alcohols are readily prepared by condensation of an unsaturated alcohol, such as allyl alcohol or vinyl alcohol, with mercaptans such as methyl, ethyl, propyl, amyl, hexyl, 2-ethylhexyl, etc., mercaptans. The resulting thia-alcohols are exemplified by 4-thiaoctyl alcohol, 3-thiaoctyl alcohol, 6-ethyl-3-thiaheptyl alcohol, 7-methyl-4-thiaoctyl alcohol, 5-ethyl-4-thiahexyl alcohol and 4-thiahexyl alcohol. Typical esters prepared by the esterification of silicic acid with these alcohols include the following: Tetra(4-thiaoctyl)silicate, tetra(7-methyl-3-thiaoctyl)silicate, tetra(6-ethyl-3-thiaheptyl)silicate, tetra(7-methyl-4-thiaoctyl)silicate, tetra(5-ethyl-4-thiahexyl)silicate and tetra(4-thiahexyl)thiosilicate. The corresponding esters may also be prepared by the esterification of phosphorus or dicarboxylic acids with the same type of alcohols. The esters so prepared exhibit excellent extreme pressure properties and a high response to the present combined additives.

Another preferred type of ester comprises those formed by the complete esterification of aliphatic polycarboxylic acids such as disclosed in U. S. Patent 2,481,372 to Von Fuchs et al.

Compounds characterizing the esters of the present invention include, for example, 2-methylheptyl adipate, 3-ethylhexyl adipate, dioctyl phthalate, dihexyl pimelate, 3-methylheptyl pimelate, 3,3-diisopropylhexyl pimelate, 2-ethylhexyl sebacate, polyallyl pelargonate, polyallyl caprylate, polyvinyl pelargonate, polyvinyl caprylate, as well as their homologs, analogs and derivatives. Triesters exemplified by trioctyl aconitate are suitable as well.

In some instances it may also be advantageous to incorporate an additional antioxidant in about the same proportions as the polyamino polyphenyl compound. The function of this supplemental antioxidant or third additive is to reinforce the primary additives. This is desirable because different types of antioxidants seem to exhibit a maximum effectiveness in the presence of particular metal surfaces or metallic oxidation catalysts and a minimum effectiveness with other metals. Hence when several different metals are in contact with the lubricant, it is well to have antioxidants which are particularly effective toward two or more types of metals.

Two classes of supplemental antioxidants have been found especially advantageous in association with the present dibasic acid corrosion inhibitors and the polyamino polyphenyl antioxidants. The first class consists of the N-aryl naphthylamines, typified by phenyl alpha naphthylamine, phenyl beta naphthylamine and di-naphthylamines.

The second class consists of polyalkyl arylhydroxy compounds. That is, they may have only one hydroxyl group (alkyl phenols) or more than one hydroxyl group (alkyl cresol, alkyl resorcinol, etc.). Preferably short alkyl groups—having up to about eight or ten carbon atoms—are attached to the aromatic nucleus at the two, four and/or six positions; advantageously at least one of the alkyl radicals is a tertiary alkyl. Particular examples are ditertiary-butyl para-cresol, 2,4-dimethyl-6-tertiary octyl phenol, pentamethyl- or pentaethyl-phenol and tritertiary-butyl phenol.

Among sulfurized olefins found to be especially useful as supplementary additives are, for example: sulfurized paraffin wax (as produced by chlorination of paraffin wax, having a molecular weight between about 225 and 425, dehydrochlorination of the chlorinated product to produce wax olefins, and sulfurization of the latter); sulfurized olefin or diolefin polymers boiling above about 400° C. such as obtained as by-products in the refining of cracked distillates with clay or other refining agents, or in the polymerization of normally gaseous olefins to produce gasoline or the like (e. g. sulfurized methyl pentadiene polymer); sulfurized esters of unsaturated fatty acids with monohydric alcohols, as methyl, ethyl, propyl, etc. oleate, or linoleate; sulfurized sperm oil; sulfurized jojoba oil; etc.

Also particularly effective are the oil-soluble reaction products of polychlor paraffin wax with sodium polysulfide which are compounds of the type

wherein $n=2$ or more.

A compounded lubricating oil may also contain other additives like additional corrosion inhibitors, such as sulfonic or fatty acids and their salts, extreme pressure compounds such as alkyl phosphates, friction reducing compounds such as allophanates, interfacial tension modifiers or foam reducing agents, blooming agents, soap thickeners to form grease, viscosity regulators such as acryloid polymers, detergents, etc.

Detergents may be formed from the oil-soluble salts of various bases with detergent forming acids. Such bases include metallic as well as organic bases. Metallic bases include those of the alkali metals, as well as Cu, Mg, Ca, Sr, Ba, Zn, Cd, Al, Sn, Pb, Cr, Mn, Fe, Ni, Co, etc. Organic bases include various nitrogen bases as primary, secondary, tertiary and quaternary amines.

Examples of detergent forming acids are the various fatty acids of, say, 10 to 30 carbon atoms, wool fat acids, paraffin wax acids (produced by oxidation of paraffin wax), chlorinated fatty acids, aromatic carboxylic acids including aryl fatty acids, aryl hydroxy fatty acids, paraffin wax benzoic acids, various alkyl salicylic acids, phthalic acid mono esters, aromatic keto acids, aromatic ether acids; diphenols as di(alkyl phenol) sulfides and disulfides, methylene bis-alkyl-phenols; sulfonic acids such as may be produced by treatment of alkyl aromatic hydrocarbons or high boiling petroleum oils with sulfuric acid; sulfuric acid mono esters; phosphoric acid mono and di-esters, including the corresponding thiophosphoric acids, phosphonic and arsonic acids, etc.

Non-metallic detergents include compounds such as the phosphatides (e. g. lecithin), certain fatty oils as rapeseed oils, voltolized fatty or mineral oils.

Other detergents are the alkaline earth phosphate di-esters, including the thiophosphate diesters; the alkaline earth diphenolates, specifically the calcium and barium salts of diphenol mono- and polysulfiides; etc.

Particularly effective detergents are the polyvalent metal salts of the resinous condensation products of low molecular weight aldehydes (such as HCHO, CH$_3$CHO, etc.) with alkylated aryl hydroxy products (such as alkyl, phenol, alkyl, naphthol, etc.). They may be typified by the calcium salt of the reaction product of formaldehyde and iso-octyl phenol

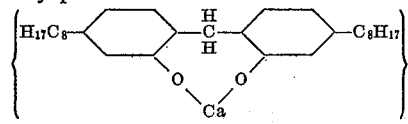

wherein $n$ is a small integer such as 2, 3 or 4 or the product is a mixture of such polymers.

Detergents are employed in proportions of about 0.25% to about 5% by weight of the total composition.

*Example 1*

[Base fluid: Dinonyl isooctenephosphonate 175° C., 70 hours]

| Metal | Metal weight loss, mg./cm.² | | | | | | |
|---|---|---|---|---|---|---|---|
| | Uninhibited | 0.5% Tetra-methyl diamino diphenyl methane | 1% Tetra-methyl diamino diphenyl methane | 1.5% Tetra-methyl diamino diphenyl methane | 0.2% Pheno-thiazine | 1% Pheno-thiazine | 0.5% Tetra-methyl diamino diphenyl methane+ 0.5% Pheno-thiazine |
| Cu | 115 | 11.8 | 1.6 | 1.4 | 47.6 | 76.8 | 0.64 |
| Mg | 0.9 | .04 | .2 | .4 | 0 | 0 | 0 |
| Fe | 0.4 | 0 | .2 | .3 | 0 | 0 | 0.1 |
| Al | 0.2 | 0 | .1 | .4 | .1 | 0 | 0 |
| Percent Inc. Visc. 100° F | Solid | 34.5 | 58 | 18. | 132 | 192 | 14 |
| Acid Neut. No | 162 | 27.8 | 51.5 | 14.9 | 82.8 | 95.1 | 10.2 |

Example 2

These compositions were tested according to specification MIL-O-5606 (168 hrs. at 121° C.).

| Composition: | | |
|---|---|---|
| Trioctyl phosphate _____ percent | 89.1 | 90 |
| Bright stock _____ do | 9.9 | 10 |
| 0.5% Tetramethyl diamino diphenyl methane percent | 0.5 | None |
| 0.5% phenothiazine _____ do | 0.5 | None |
| Corrosion (mg. per cm.): | | |
| Cu | .55 | 4.95 |
| Mg | .03 | 0.02 |
| Fe | 0 | 0.01 |
| Cd | 0.02 | 27.6 |
| Al | 0.01 | 0.01 |
| Percent Inc. Visc. 100° F | 6 | 0.02 |
| Acid Neut. No | 0.62 | 42 |

| Examples (Percent by Weight of Components) | 3 | 4 | 5 | 6 | 7 | 8 | 9 |
|---|---|---|---|---|---|---|---|
| Lubricants: | | | | | | | |
| Dihexyl hexane phosphonate | 98 | | | | | | |
| Bis(2-ethylhexyl) sebacate | | 97 | | | | | |
| Tetrakisoctyl silicate | | | | 99 | | | |
| Tricresyl phosphate | | | 99 | | 96 | | |
| Bis(dibutylphosphono) hexane | | | | | | 97 | |
| Hexanediol bis(dibutanephosphinate) | | | | | | | 95 |
| Diaminodiarylalkanes: | | | | | | | |
| N,N'-tetramethyl diaminodiphenyl methane | 1 | 1.5 | | 0.5 | | | |
| N,N'-tetraethyl diaminodiphenyl ethane | | | 0.5 | | | 1.5 | |
| 2,2'-diethyl-4,4'-diaminodiphenyl methane | | | | | 2 | | 2.5 |
| Thiodiarylamines: | | | | | | | |
| Thiodiphenyl amine | 1 | 1.5 | 0.5 | | | | |
| Thionaphthylphenyl | | | | | 2 | | |
| Thiodinaphthyl amine | | | | | | 1.5 | |
| 4-Aminothiodiphenyl amine | | | | 0.5 | | | 2.5 |

The examples shown illustrate the advantages gained by the use of the subject synergistic combination of additives for the reduction of corrosion and protection of the esters against rapid deterioration due to heating and oxidation. The test employed in examining the subject compositions comprises heating 20 cc. of the composited fluid at a temperature of 175° C. for 71 hours in the presence of 0.4 square inch of each of the metals listed in the following tables while bubbling one liter of air per hour through the sample. The apparatus employed is a modification of that described in Federal Specification Catalogue VV-L-791D, as specification 530.8.2.

Example 1 indicates the advantage of combining phenothiazine with tetramethyl diamino diphenyl methane. In this particular example the base fluid being stabilized was dinonyl isooctenephosphonate. Example 2 shows the advantage of the same combination of inhibitors in the stabilization of a mixture of trioctyl phosphate and bright stock. In the latter example a lower temperature was employed, namely, 121° C., and the conditions were those given in the Armed Forces Specification MIL-O-5606. The balance of the examples disclose compositions taking advantage of the demonstrated synergism as described hereinbefore.

I claim as my invention:

1. A lubricating composition comprising a major amount of an aliphatic ester of a phosphorus acid having dispersed therethrough from about 0.25% to about 5% by weight each of a thiodiphenylamine and a diaminodiphenyl alkane, said alkane containing from 1 to 2 carbon atoms.

2. A lubricating composition comprising a major amount of an aliphatic phosphorus acid ester having dispersed therethrough from about 0.25% to about 5% by weight each of a diamino diphenyl methane and of a thiodiphenylamine.

3. A lubricating composition comprising a major amount of a dialkyl alkene phosphonate having dispersed therethrough from about 0.25% to about 5% by weight each of a N-alkylated diamino diphenyl methane and a thiodiphenylamine.

4. A lubricating composition comprising a major amount of dinonyl isooctenephosphonate having dispersed therethrough 0.5% by weight of phenothiazine and 0.5% by weight of tetramethyl diamino diphenyl methane.

5. A lubricating composition comprising a major amount of a dialkyl alkene phosphonate having dispersed therethrough from about 0.25% to about 5% by weight each of phenothiazine and tetramethyl diamino diphenyl methane.

References Cited in the file of this patent

UNITED STATES PATENTS

| 2,190,648 | Cantrell et al. | Feb. 20, 1940 |
| 2,290,860 | Burk et al. | July 28, 1942 |
| 2,480,450 | Cocroft et al. | Aug. 30, 1949 |
| 2,587,662 | Smith | Mar. 4, 1952 |